No. 614,038. Patented Nov. 8, 1898.
B. L. TOQUET.
COVER FOR POWER TRANSMITTING CHAINS.
(Application filed July 23, 1897.)
(No Model.)

WITNESSES:
F. W. Wright
S. C. Connor

INVENTOR
B. LOUIS TOQUET.
BY
Howson and Howson
ATTORNEYS.

UNITED STATES PATENT OFFICE.

BENJAMIN LOUIS TOQUET, OF WESTPORT, CONNECTICUT.

COVER FOR POWER-TRANSMITTING CHAINS.

SPECIFICATION forming part of Letters Patent No. 614,038, dated November 8, 1898.

Application filed July 23, 1897. Serial No. 645,733. (No model.)

*To all whom it may concern:*

Be it known that I, BENJAMIN LOUIS TOQUET, a citizen of the United States of America, residing in Westport, Connecticut, have invented an Improved Cover for Power-Transmitting Chains, of which the following is a specification.

The object of my invention is to provide power-transmitting chains of cycles and other machines with light and simple covers to protect the chains, more particularly from dust and dirt.

Figure 1:
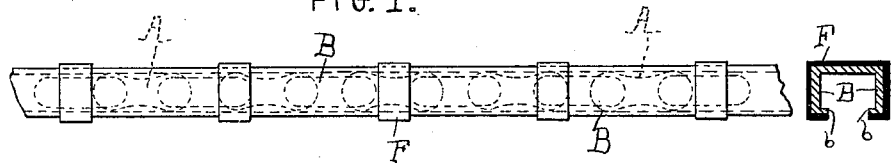
Figure 2:
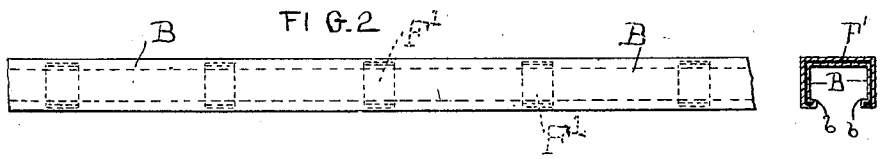

In the accompanying drawings, Figure 1 shows a part of a chain-cover in cross-section and side elevation. Fig. 2 shows a modification in cross-section and side elevation; and Fig. 3 shows another modification in cross-section, plan view, and side elevation.

In Fig. 1 the linked bicycle-chain A is shown in dotted lines and as carrying a cover B, of rubber, which incloses the outer face of the chain and its opposite sides. The cover is also provided with inwardly-turned flanges $b\ b$ on the inner face of the chain, but leaving sufficient space for the entrance of the teeth of the sprocket-wheels into engagement with the links of the chain.

The cover is provided at intervals with retaining-clips, which may be applied to the outside of the cover, as shown at F, Fig. 1, or applied in the interior of the cover $B^2$ in the course of manufacture, as shown at F' in Fig. 2.

Figure 3:
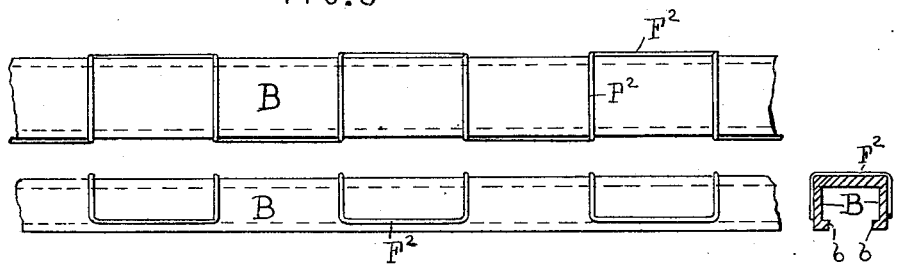

In Fig. 3 I have shown clips made of a continuous piece of wire $F^2$, bent over the outside of the rubber cover, as will be readily understood. These several clips aid in keeping the cover tight upon the chain and prevent the cover from gaping open on the inner side in passing around the sprocket-wheels.

I do not claim, broadly, a power-transmitting chain with a flexible cover having clips to hold it to the chain; but

I claim as my invention—

1. A power-transmitting chain, in combination with a flexible cover over the outer face and sides of the chain and inwardly-turned flanges at the inner face, leaving space at the inner side for the sprocket-wheels to engage with the chain.

2. A power-transmitting chain in combination with a flexible cover over the outer face and sides of the chain and inwardly-turned flanges at the inner face and clips to hold the cover to the chain, substantially as described.

In testimony whereof I have signed my name to this specification in the presence of two subscribing witnesses.

BENJAMIN LOUIS TOQUET.

Witnesses:
   C. L. PECK,
   BENJ. H. TOQUET.